(12) United States Patent
Ebermann et al.

(10) Patent No.: US 6,700,478 B2
(45) Date of Patent: Mar. 2, 2004

(54) METHOD AND APPARATUS FOR TIME-STAGGERED GENERATION OF IDENTIFYING SIGNALS

(75) Inventors: Joachim Ebermann, Amtsberg (DE); Dieter Schwarzbach, Gersdorf (DE); Horst Stiehler, Burgstaedt (DE)

(73) Assignee: Siemens Aktiengesellschaft (DE)

( * ) Notice: Subject to any disclaimer, the term of this patent is extended or adjusted under 35 U.S.C. 154(b) by 59 days.

(21) Appl. No.: 10/000,623

(22) Filed: Nov. 15, 2001

(65) Prior Publication Data

US 2003/0037186 A1 Feb. 20, 2003

(30) Foreign Application Priority Data

Aug. 17, 2001 (DE) ......................................... 101 40 471

(51) Int. Cl.⁷ ................................................. G08B 1/00
(52) U.S. Cl. ................................ 340/309.16; 340/309.8
(58) Field of Search ........................ 340/309.16, 309.4, 340/309.8, 309.9, 2.1, 309.7; 702/14, 17; 375/144, 148; 705/14, 16

(56) References Cited

U.S. PATENT DOCUMENTS

| | | | | | |
|---|---|---|---|---|---|
| 5,537,400 | A | * | 7/1996 | Diaz et al. .................. | 370/58.2 |
| 5,544,168 | A | * | 8/1996 | Jeffrery et al. ............... | 340/2.1 |
| 5,892,535 | A | * | 4/1999 | Allen et al. .................... | 348/9 |
| 6,314,127 | B1 | * | 11/2001 | Lynch et al. ................. | 375/144 |

\* cited by examiner

*Primary Examiner*—Van Trieu
(74) *Attorney, Agent, or Firm*—Baker Botts LLP

(57) ABSTRACT

The invention concerns a method and an apparatus for time-staggered generation of identifying signals by programmable automation components (AK1, AK2) with a system time recorder (SZ). A user (A) or an automation component (AK1, AK2) or a user program (AP) can register a time-staggered identifying signal (K) with an event manager (EV). The event manager (EV) controls a system time counter (SZ) and signals waiting events (E1–E3) back to the user (A) or the automation component (AK1, AK2) or the user program (AP). The event (E1–E3) is thereby enabled and an identifying signal (K) is generated.

11 Claims, 2 Drawing Sheets

# METHOD AND APPARATUS FOR TIME-STAGGERED GENERATION OF IDENTIFYING SIGNALS

FIELD OF THE INVENTION

The invention relates to a method and an apparatus for time-staggered generation of identifying signals by programmable automation components with a system time recorder.

BACKGROUND OF THE INVENTION

Programmable process controllers having automation components use process data that is read, processed and output periodically or at the time of use. In this system, signals also need to be output on a time-controlled basis using timer modules in the user program or special peripheral modules, which provide a programmable timer module for each time-delayed output signal.

The timer modules in the user program have a relatively large time increment of about one millisecond. The start of time-staggered output of signals or identifying signals is determined in the user program by means of the programming language. After the programmed time has elapsed, response modules in the user program are enabled in which the user can output an identifying signal, such as a switching signal, to the process.

Peripheral units with programmable timer modules are special units that use a hardware-implemented time recorder to provide the time delay for each signal. They are permanently assigned to the signal and can only be used with correspondingly large amounts of design and programming time.

SUMMARY OF THE INVENTION

The object of the present invention is to provide a method and device that enable convenient time-staggered generation of identifying signals with minimal hardware complexity. This objective is achieved according to the present invention by assigning an identifying signal to a temporal event by a user, or by an automation component or a by a user program; and registering the event with an event manager with a required event time-delay. The events are sorted chronologically by the event manager, and a system time recorder having a time interval lasting until the next event is started by the event manager. The system time recorder signals when this time interval has elapsed. The event is thus enabled by the event manager, and an identifying signal is thereby generated. Identifying signals can be designed with simplicity and flexibility and changing the assignment of the identifying signals to an event is not complex. Using the event manager, a time recorder can be used advantageously for the generation of more than one different identifying signal.

In a preferred embodiment of the method according to the present invention, at least two system time recorders are used for the generation of identifying signals. Depending on the appearance of the identifying signal, more than one system time recorder or counter can hence be used by the event manager, each of which can also have different time increments.

Another preferred method according to the present invention is checking the availability of the identifying signal for a required event by the user program, or by the signal-specific driver. If the identifying signal is not available at a required point in time, the user program branches into a subprogram or another program section for error handling. By this means, the availability of identifying signals at the required event times is checked. A dual request for an identifying signal at the same instant is thus signaled to the user program and can be avoided by a subsequent error handling procedure.

Yet another preferred method according to the present invention is defining an identifying signal-ON period by an automation component or by a user program; the user program (or the event manager or the signal-specific driver) generates two event input signals at an interval during by the ON period in the event manager. The first signal represents "Start an action", and the second signal represents "Stop an action". By this means the user can conveniently generate in the event manager an ON period for an identifying signal by means of an automation component or a user program using a program or command call with the ON period as a parameter. It is also conceivable that pre-defined ON periods may be called.

Another preferred aspect of the method according to the present invention is specifying an identifying signal-OFF period instead of the identifying signal ON period. By this means the user can conveniently generate in the event manager an OFF period for an identifying signal by means of an automation component or a user program using a program or command call and the OFF period as a parameter. It is also conceivable that pre-defined OFF periods may be called.

Another preferred feature of the method according to the present invention is to define any identifying signal pattern in a software environment by a user or by a user program; and having the user program (or the event manager or the signal-specific driver) generate in the event manager the event input signals associated with the signal pattern, when the identifying signal pattern is called. By this means any required sequences of identifying signals can be defined and called up by the user via an automation component or via a user program.

A further preferred feature of the method according to the present invention is the defining of periodically recurring ON periods or identifying signal patterns. From the user's viewpoint, indication that an identifying signal sequence is a periodically recurring pattern simplifies the definition and/or the triggering and/or the storage of periodically recurring identifying signals or identifying signal patterns. It is also optionally possible to define a time interval in the call command during which a periodically recurring identifying signal sequence shall be executed.

Another preferred aspect of the method according to the present invention is where the events of the event manager that have not yet been carried out in time can be corrected. Accordingly, all of the events of the event manager that have not yet been implemented can be edited and if necessary corrected to suit new requirements. For instance a user can define time-staggered identifying signal events which can be confirmed with each polling cycle of the automation component.

Another preferred embodiment of the method according to the present invention is assigning at least one access authorization property to an event; and by utilizing different access authorization properties, different post-processing options are provided for the event or the event data. By assigning access rights, only authorized processes have access to data. For instance a user can define in advance which user, which component or which access process in general has which access rights in the system and is permitted to read and/or change and/or write to the event of the event manager. This also relates to user programs or automation components.

An apparatus in which the method of the present invention may be used includes a user or an automation component or a user program, by which an identifying signal can be assigned to a temporal event; and event manager with which the event can be registered with a required event time-delay. The event manager is capable of chronologically sorting the events. The apparatus also has a system time recorder with a time interval lasting until the next event can be started by the event manager, and the system time recorder/counter can signal when this time interval has elapsed. The event manager can thus enable the event, and thereby cause an identifying signal to be generated. Using such an apparatus one can achieve convenient time-staggered generation of identifying signals with minimum hardware complexity.

BRIEF DESCRIPTION OF THE DRAWINGS

The present invention is disclosed in greater detail below in connection with an embodiment of the present invention as shown in the drawings, in which.

DETAILED DESCRIPTION OF THE INVENTION

Figure 1:
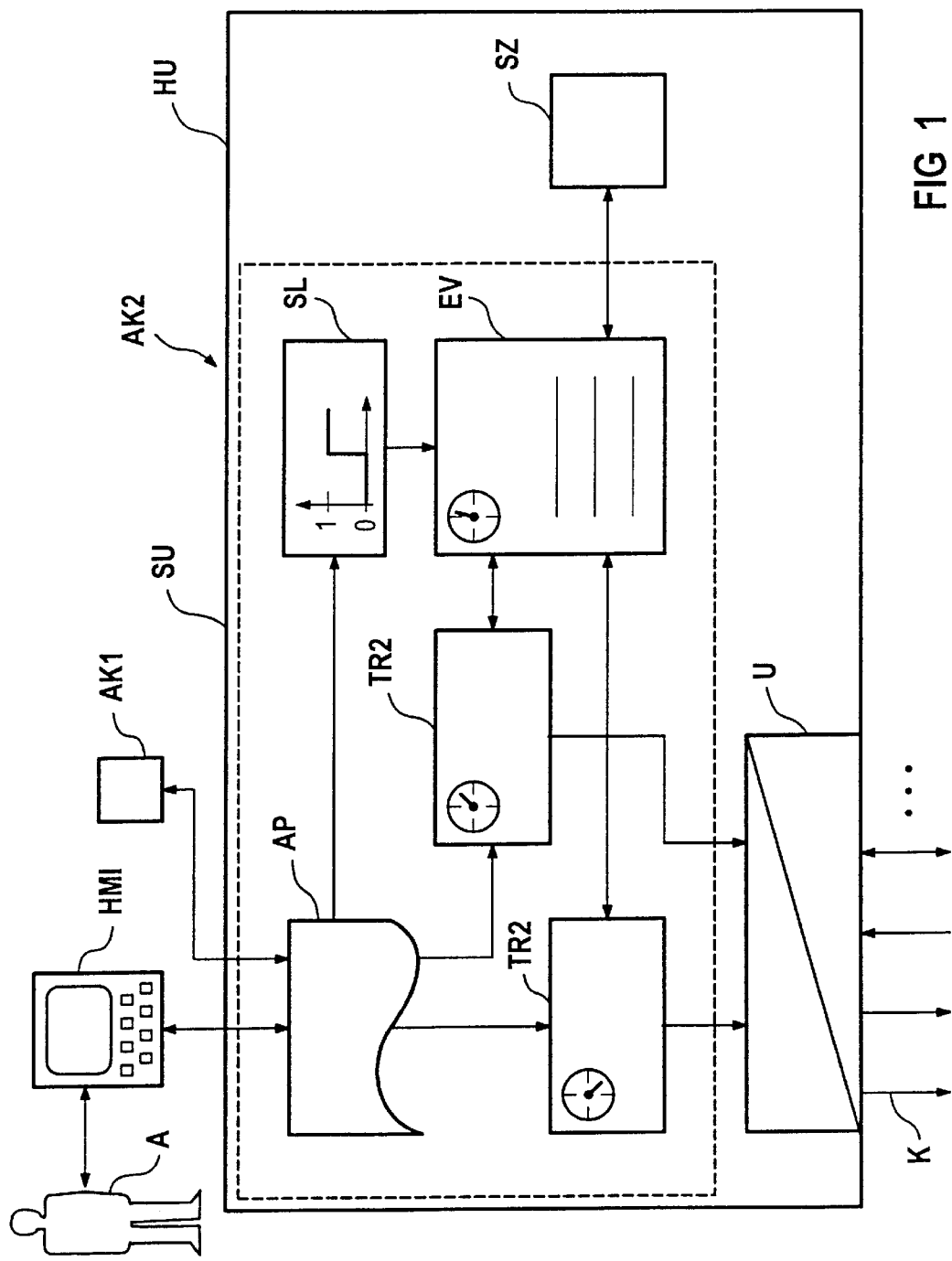
FIG. 1 shows a symbolic top-level view of the system architecture of a programmable automation component with a time recorder.

FIG. 1 illustrates a top-level view of the system architecture having a programmable automation components AK1, AK2 with a time recorder SZ. In a hardware environment HU there is a system time counter SZ with high-resolution time increments, for example one microsecond or less, and a signal converter U. The hardware environment HU is shown by a large rectangle containing the software environment SU drawn in dashed lines. The signal converter U also contained in the hardware environment HU, converts the events E1 to E3 generated by the software environment SU into identifying signals K. The signal converter U is illustrated by a rectangle containing a diagonal line. In the signal converter U, signals may be conditioned and/or amplified. In addition, the signal converter U can generate and also receive identifying signals K, indicated by arrows drawn respectively leaving and entering the signal converter U of the hardware environment HU. Here only one identifying signal K is labeled, and further identifying signals K are depicted by three horizontal dots.

The software environment SU runs in a hardware environment HU in which the system time counter SZ is also installed. It is also conceivable, however, that the software environment SU is implemented on an automation component AK1, AK2 in which there is no system time counter SZ. In this case a link between a system time counter SZ and the software environment SU must be set up via data links. All data links are represented in the diagram by arrow connections or double-arrow connections, and are not shown in any more detail. The arrow direction symbolizes the direction of data flow.

A user program AP communicates with a user A via an operator control and monitoring unit HMI (Human Machine Interface). In addition, the user program AP can exchange data with another automation component AK1, AK2.

An event E1 to E3 programmed by the user A is registered with an event manager EV by an identifying signal driver TR1, TR2. In this process the event manager EV checks the availability of the required identifying signal K at the requested time T0 to T5, and notifies the identifying signal drivers TR1 and TR2.

The event manager EV arranges the events E1 to E3 chronologically in a list and starts the system time counter SZ with necessary event time-delays EZ1 to EZ3. The first event element in the list always has the shortest event time-delay EZ1 to EZ3. All time delays are corrected with respect to signal transit times SL and systematic errors before being entered in the event manager EV. It is also possible to specify in the user program AP or in the system transit time block SL, user-defined delays, for example delays specific to the identifying signal.

The system transit times SL are represented in the software environment SU by a rectangle containing an XY plot showing a delayed digital signal, where the X-axis represents a time axis. The system transit times entered by a user A via an operator control and monitoring unit HMI are transferred by the user program AP to the system transit times software block SL, which passes the system transit times SL to the event manager EV. This can be performed specifically for each identifying signal so that the event manager EV automatically assigns the correction times to the respective events E1 to E3.

Each event E1 to E3 entered in the list of the event manager EV can be changed or deleted up to the time it is enabled. For this purpose the event E1 to E3 can be identified uniquely from the assigned signal driver TR1 and TR2 and the specified action.

After the required event time-delay EZ1 to EZ3 has elapsed in the system time counter SZ, the action for the first event element in the list of the event manager EV is performed, i.e. the activation function of the associated signal driver TR1 and TR2 is called, which for instance might set an identifying signal output of the signal converter U. The element in the list is thereby processed and is deleted. All event elements still on the list are corrected according to their remaining event time-delays EZ1 to EZ3, and the system time counter SZ is restarted with the event time-delays EZ1 to EZ3 that appear next in the list.

It is also possible, however, that only the time intervals T01 to T23 between the different events E1 to E3 are saved in the event manager EV, so that after processing the first element in the list, the system time counter SZ is only started with the next event element in the list. In this case it is not necessary to correct all the event elements on the list. If there is no event E1 to E3 waiting, the time recorder SZ can run in an idle mode.

The signal drivers are represented by a rectangle each containing a stopwatch symbol showing a different pointer position. This is meant to illustrate the triggering of an event at a specific time. The drivers themselves do not use the system time here to perform this function.

Figure 2:
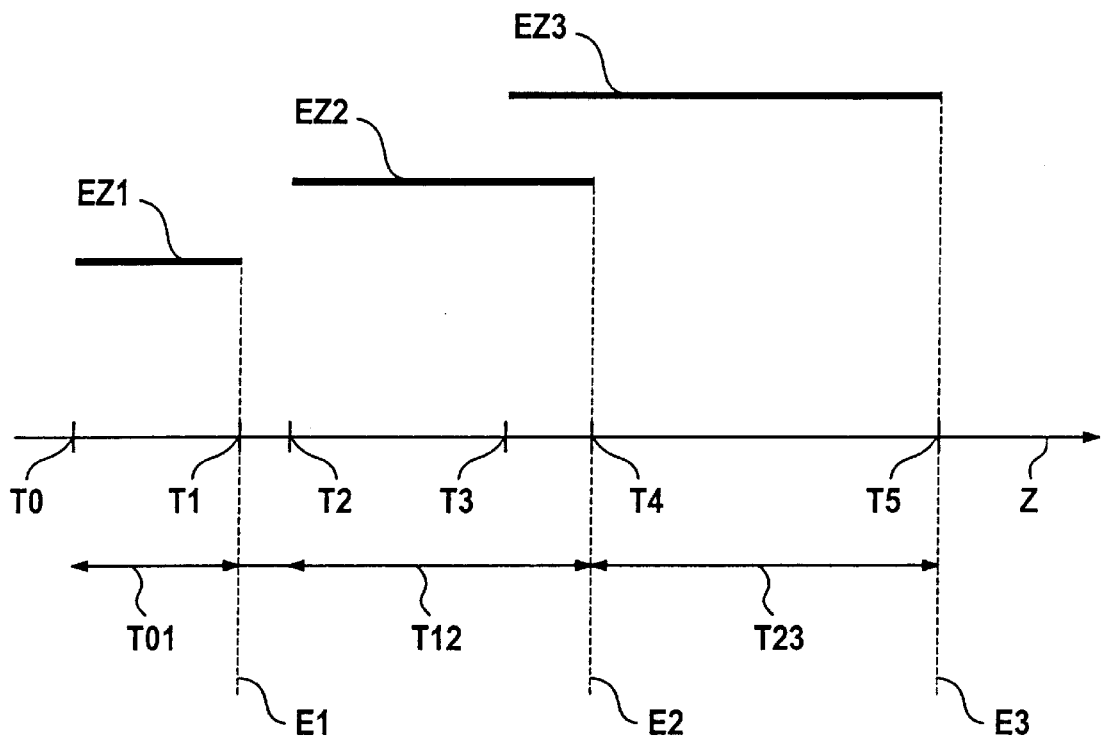
FIG. 2 shows time sequences for time-staggered generation of identifying signals.

FIG. 2 shows time sequences for time-staggered generation of identifying signals. The times T0 to T5 are labeled along a horizontal time axis Z that has an arrow pointing in the positive X-direction. At time T0 the event E1 with the event time-delay EZ1 is registered by a user program AP with an event manager EV via a signal driver TR1, TR2. In this case the time interval T01 is entered in the first listed event element. All time intervals T01 to T23 are indicated by dual-ended arrows running along a line parallel to the time axis Z.

After the time interval EZ1 has elapsed, the system time counter SZ informs the event manager EV. The corresponding event element on the list is deleted from the event manager EV. In this example there is no further listed event element in the event manager EV at time T1, and the system time counter continues running in idle mode. An event E2 with event time-delay EZ2 is not requested until time T2. The event manager EV thus starts the system time counter SZ at time T2 with the time interval T12.

At time T3, i.e. during the event time-delay EZ2, another event E3 with an associated event time-delay EZ3 is requested. This is entered in the event manager EV. As explained, it is possible here to enter the remaining time interval T01 to T23 until the event E3 in the list, or for the current list entry to contain the time difference between the events E1 to E3 in the event manager EV.

Optimum use can be made of a system time counter SZ by setting up an event manager EV. A user A signals its events E1 to E3 in the user program AP. The management and time management of the system time counter SZ is performed by the event manager EV. Thus the user A need not go through a laborious design procedure for each identifying signal K. The method according to the invention and the apparatus according to the invention not only permit hardware resources to be saved, but also permit valuable design and installation time to be saved. Even when a user A wants to make changes, for instance to add a task to an automation component AK1, AK2, a user A can incorporate this relatively easily via the software environment SU. An additional hardware component, for instance in the form of a peripheral unit, is not required.

It should also be mentioned that actions or process steps to be triggered by a user A or by an automation component AK1, AK2 or by a user program AP, can also be triggered by other signals K. This includes, amongst others, external trigger and identifying signals K.

We claim:

1. A method for time-staggered generation of identifying signals by programmable automation components having a system time recorder, comprising assigning an identifying signal to a temporal event, registering the event with an event manager with a required event time-delay, chronologically sorting the events by the event manager utilizing a system time recorder having a time interval lasting until a next event is started by the event manager, wherein the system time recorder signals when the time interval has elapsed, the event is enabled, and an identifying signal is generated.

2. The method according to claim 1, further comprising generating identifying signals by at least two system time recorders.

3. The method according to claim 1, further comprising correcting the event time-delay for system transit times in the event manager.

4. The method according to claim 1, further comprising checking the availability of the identifying signal by a user program or by a signal-specific driver, and if the identifying signal is not available at a required point in time, enabling the user program to branch into a subprogram or another program section for error handling.

5. A method according to claim 1, further comprising defining an identifying signal-ON period by an automation component or a user program, whereby the user program or the event manager or the signal-specific driver generates in the event manager two event input signals during an interval of the ON period, wherein the first signal represents "Start an action" and the second signal represents "Stop an action".

6. A method according to claim 5, further comprising defining an identifying signal-OFF period instead of the identifying signal-ON period.

7. A method according to claim 5, further comprising defining periodically recurring ON periods or identifying signal patterns.

8. A method according to claim 1, further comprising defining any identifying signal pattern in a software environment by a user or by a user program, and the user program or the event manager or the signal-specific driver generates in the event manager the event input signals associated with the pattern, when the identifying signal pattern is called.

9. A method according to claim 1, wherein events of the event manager that have not been carried out in time can be corrected.

10. A method according to claim 1, further comprising assigning at least one access authorization property to an event.

11. An apparatus for time-staggered generation of identifying signals by programmable automation components having a system time recorder, comprising a device for assigning an identifying signal to a temporal event, an event manager for registering the event with a required event time-delay, wherein the event manager chronologically sorts the events, further comprising a system time recorder having a time interval lasting until the next event can be started by the event manager, and wherein the system time recorder signals when this time interval has elapsed, and the event having been performed, and an identifying signal is generated.

* * * * *